United States Patent
Vandewall et al.

(10) Patent No.: US 10,993,526 B2
(45) Date of Patent: May 4, 2021

(54) RETRACTABLE SUPPORT SURFACE AND METHOD OF ASSEMBLING THE SAME

(71) Applicant: The Boeing Company, Chicago, IL (US)

(72) Inventors: Cynthia A. Vandewall, Snohomish, WA (US); Blake Lane, Cincinnati, OH (US); Craig G. Vogel, Cincinnati, OH (US); Elizabeth O'Hearn, Cincinnati, OH (US); Brian Keller, Cincinnati, OH (US); Shuai Mu, Cincinnati, OH (US); Chuyu Ruan, Guangzho (CN); Swati Chopra, Dayton, OH (US)

(73) Assignee: THE BOEING COMPANY, Chicago, IL (US)

( * ) Notice: Subject to any disclaimer, the term of this patent is extended or adjusted under 35 U.S.C. 154(b) by 254 days.

(21) Appl. No.: 16/242,748

(22) Filed: Jan. 8, 2019

(65) Prior Publication Data

US 2020/0214438 A1 Jul. 9, 2020

(51) Int. Cl.
| | |
|---|---|
| *A47B 5/04* | (2006.01) |
| *A47B 13/08* | (2006.01) |
| *B64D 11/00* | (2006.01) |
| *A47B 1/06* | (2006.01) |
| *A47B 3/04* | (2006.01) |

(52) U.S. Cl.
CPC .................. *A47B 5/04* (2013.01); *A47B 1/06* (2013.01); *A47B 3/04* (2013.01); *A47B 13/081* (2013.01); *A47B 13/088* (2013.01); *B64D 11/00* (2013.01)

(58) Field of Classification Search
CPC ....... A47B 5/04; A47B 13/081; A47B 13/088; A47B 3/04; A47B 1/06; B64D 11/00
See application file for complete search history.

(56) References Cited

U.S. PATENT DOCUMENTS

| | | | | | |
|---|---|---|---|---|---|
| 1,566,200 | A | * | 12/1925 | Napolean ................. | A47B 3/04 108/93 |
| 2,726,911 | A | * | 12/1955 | Mason ..................... | A47B 1/06 108/93 |
| 3,896,742 | A | * | 7/1975 | Ferraro .................... | B60R 5/04 108/44 |
| 4,026,219 | A | * | 5/1977 | Shupe ...................... | A47B 3/00 108/62 |
| 4,958,577 | A | * | 9/1990 | Demaio ................. | A47B 23/002 108/166 |
| 5,884,566 | A | * | 3/1999 | Chen ..................... | A47B 13/08 108/67 |

(Continued)

*Primary Examiner* — Daniel J Rohrhoff
(74) *Attorney, Agent, or Firm* — Armstrong Teasdale LLP (57) ABSTRACT

A support surface assembly includes a housing including a chamber and an opening. The support surface assembly also includes a support surface retractably coupled to the housing between a deployed position and a stored position. The support surface includes a plurality of slats pivotally coupled together, wherein each slat comprises a first end opening and an opposing second end opening. The support surface assembly also includes a plurality of rods associated with a corresponding slat of the plurality of slats. Each rod is positioned entirely within the first end opening of a first slat in the stored position and each rod is positioned partially within the second end opening of an adjacent second slat in the deployed position.

20 Claims, 6 Drawing Sheets

(56) References Cited

U.S. PATENT DOCUMENTS

| | | | |
|---|---|---|---|
| 6,125,771 A * | 10/2000 | Platt | A47B 3/083 |
| | | | 108/115 |
| 7,096,797 B2 * | 8/2006 | Sharpe | A47B 3/00 |
| | | | 108/43 |
| 8,794,162 B2 | 8/2014 | Hisata et al. | |
| 9,668,570 B2 * | 6/2017 | Mojtabavi | E05D 11/1021 |
| 2003/0020318 A1 * | 1/2003 | Liu | A47B 3/04 |
| | | | 297/452.18 |
| 2020/0010004 A1 * | 1/2020 | Becker | A47B 1/06 |

* cited by examiner

RETRACTABLE SUPPORT SURFACE AND METHOD OF ASSEMBLING THE SAME

FIELD

The following disclosure relates generally to temporary support surfaces, and, more particularly, retractable temporary support surfaces for use in aircraft.

BACKGROUND

Aircraft cabins typically include a variety of accessories for passenger and flight attendant use and convenience. Some of these accessories are fixed in position and are ready for use, some are permanently attached to other surfaces and move between deployed and stowed positions, and others are free from attachment and must be stowed in compartments when not being used. For example, galley areas of the aircraft typically include fixed metal shelving for storing items. However, these fixed metal structures are not only heavy, but also occupy a relatively large amount of space both when in use and when not being used. Additionally, first class or business class passenger areas typically include a single, small fold down tray for passenger use. However, additional space may be required during food and beverage service when the passenger's tray is occupied by their personal items and the passenger prefers to continue using their items. Furthermore, some passenger areas are reconfigurable between sitting and sleeping configurations, and known fold down trays may not be convenient or comfortable for the passenger in both seating configurations.

BRIEF DESCRIPTION

In one example, a support surface assembly is provided. The support surface assembly includes a housing including a chamber and an opening. The support surface assembly also includes a support surface retractably coupled to the housing between a deployed position and a stored position. The support surface includes a plurality of slats pivotally coupled together, wherein each slat comprises a first end opening and an opposing second end opening. The support surface assembly also includes a plurality of rods associated with a corresponding slat of the plurality of slats. Each rod is positioned entirely within the first end opening of a first slat in the stored position and each rod is positioned partially within the second end opening of an adjacent second slat in the deployed position.

In another example, a support surface for use in a support surface assembly is provided. The support surface includes a plurality of slats moveable between a deployed position and a stored position. The plurality of slats include a first slat and an adjacent second slat, wherein the first slat and second slat each comprise a first end opening and an opposing second end opening. The second end opening of the first slat is positioned adjacent the first end opening of the second slat. The support surface also includes a plurality of rods comprising a first rod positioned within the first end opening of the second slat when the plurality of slats are in the stored position. The first rod is positioned within the second end opening of the first slat when the plurality of slats are in the deployed position.

In yet another example, a method of assembling a support surface assembly is provided. The method includes pivotally coupling a plurality of slats to one another to form a support surface, wherein each slat includes a first end opening and an opposing second end opening. The method also includes retractably coupling the support surface to a housing such that the support surface is retractable between a deployed position and a stored positon. The method further includes positioning a rod in the first end opening of at least one slat. The rod is positioned entirely within the first end opening of the at least one slat in the stored position and the rod is positioned partially within the second end opening of an adjacent slat in the deployed position.

The features, functions, and advantages that have been discussed can be achieved independently in various examples of the present disclosure or may be combined in yet other examples, further details of which can be seen with reference to the following description and drawings.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

The implementations described herein relate to temporary support surfaces, and, more particularly, retractable temporary support surfaces for use in aircraft. More specifically, in the example, a support surface assembly includes a housing including a chamber and an opening. The support surface assembly also includes a support surface retractably coupled to the housing between a deployed position, when the support surface extends from the housing through the opening, and a stored position, when the support surface is positioned within the housing chamber. The support surface includes a plurality of slats pivotally coupled together, wherein each slat includes a first end opening and an opposing second end opening. The support surface assembly also includes a plurality of rods associated with a corresponding slat of the plurality of slats. Each rod is positioned entirely within the first end opening of a first slat in the stored position. As the support surface is pulled from the housing, a magnet within the housing causes the rods to slide forward to be positioned with the second end opening of the adjacent slat in the deployed position. Because the length of the second end openings is less than the length of the rods, the rods are still partially positioned within the first end opening of the original slat. In such a configuration, the rods holds the slats in place with respect to one another to form the support surface capable of holding items as desired by the user.

Figure 1:
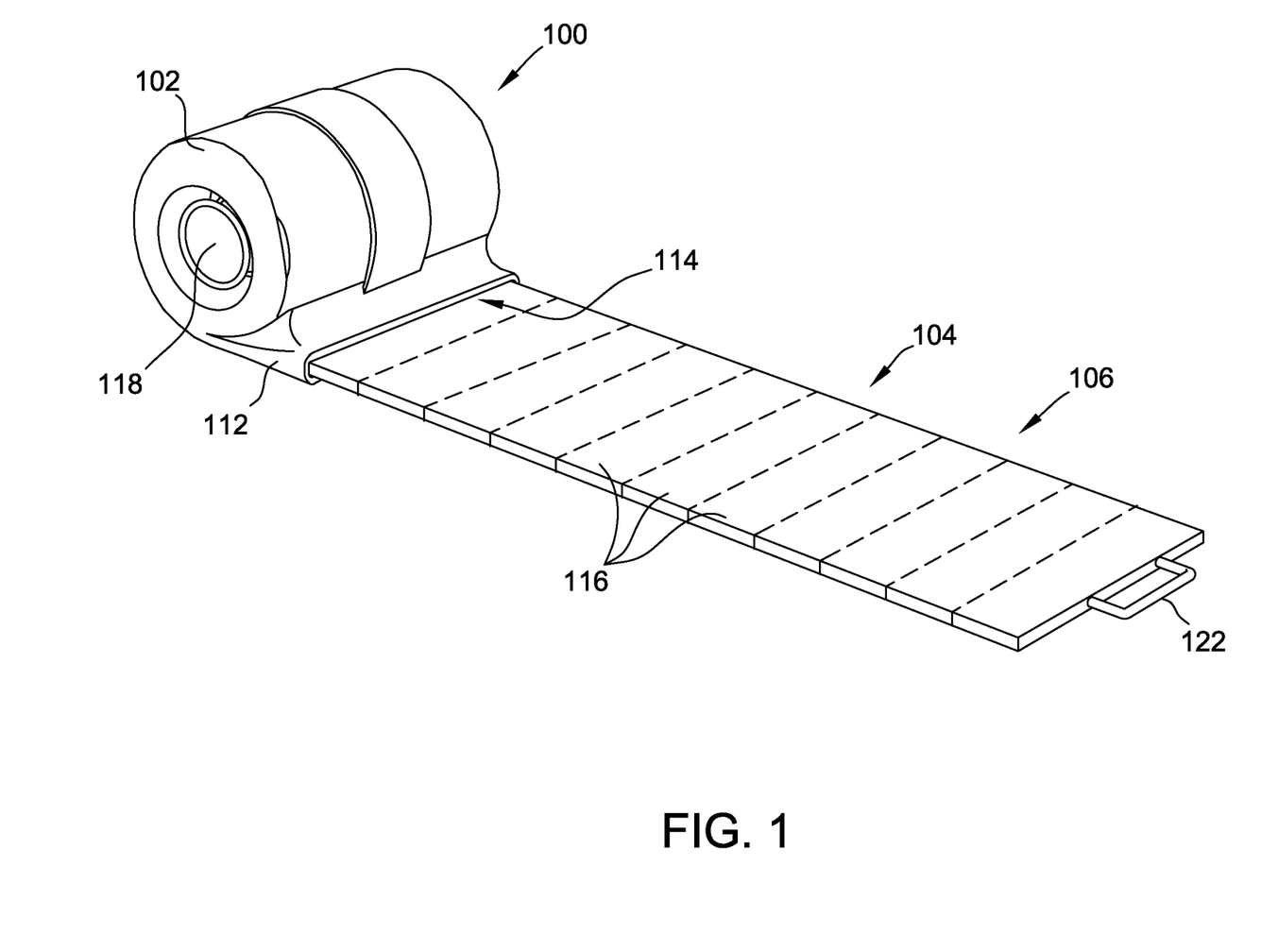
FIG. 1 is a perspective view of an exemplary support surface assembly illustrating an exemplary support surface in a deployed position.
Figure 2:
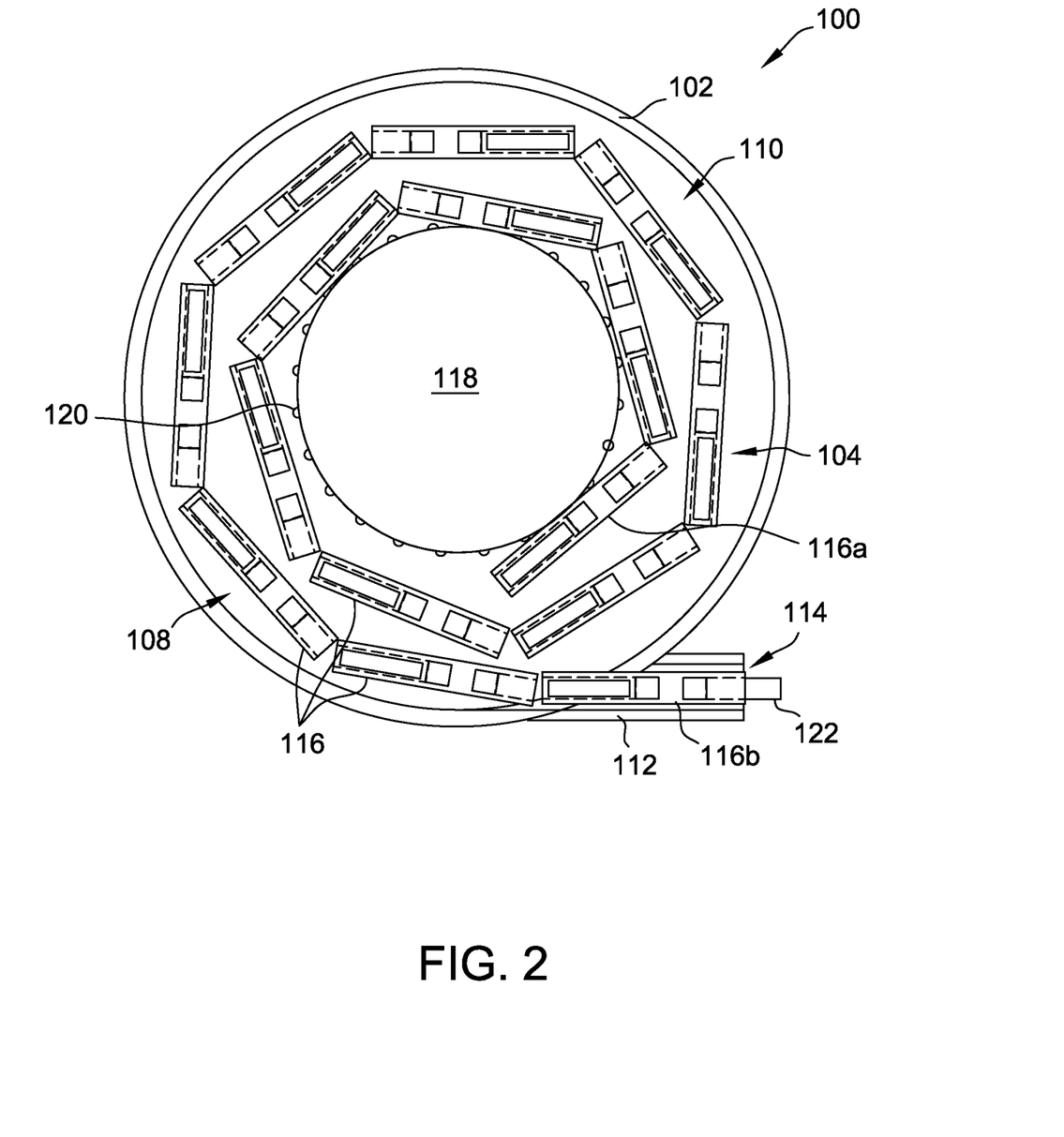
FIG. 2 is a cross-sectional view of the support surface assembly shown in FIG. 1 illustrating the support surface in a retracted position.
Figure 3:
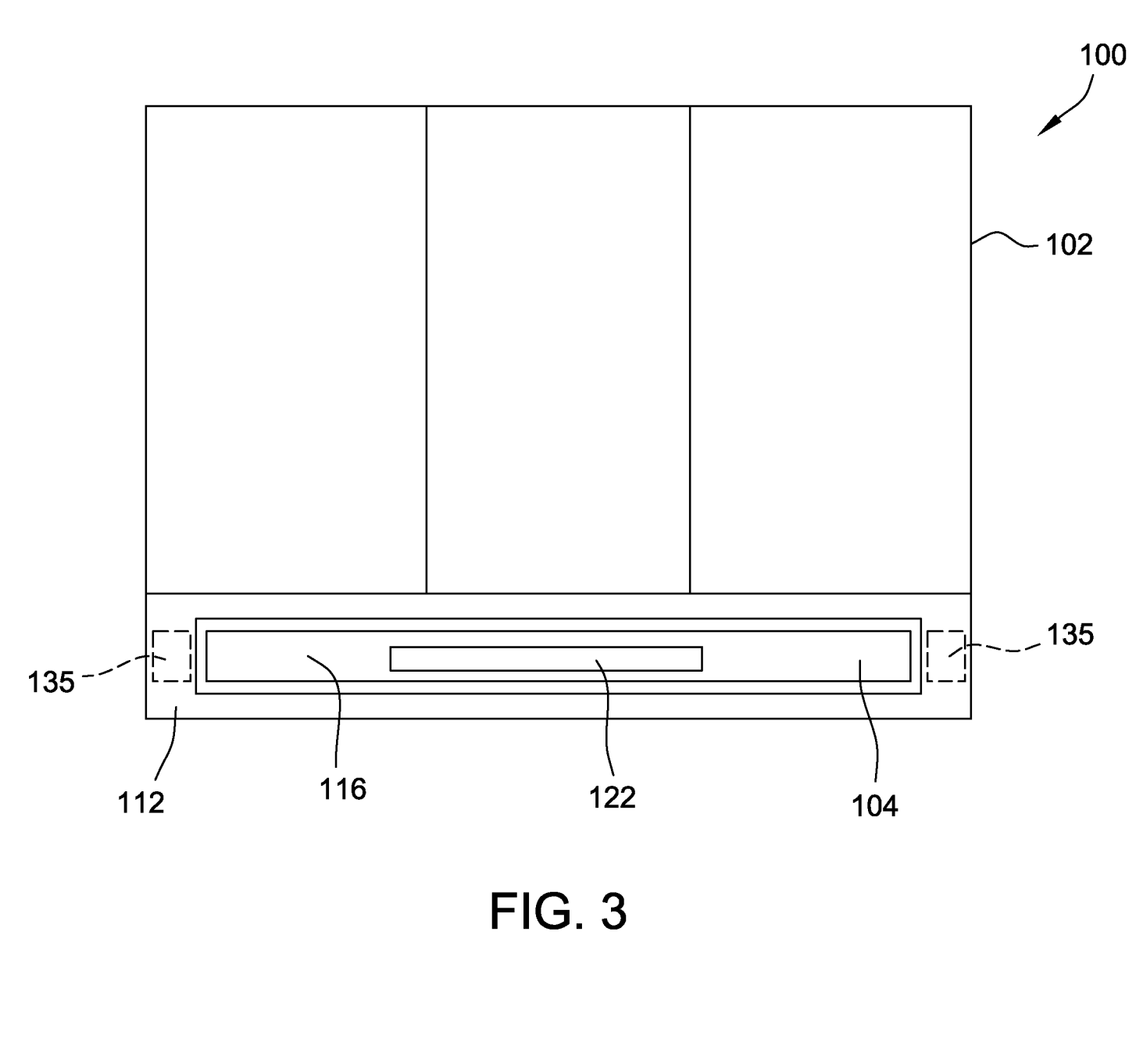
FIG. 3 is a front view of the support surface assembly shown in FIG. 1.

FIG. 1 is a perspective view of an exemplary support surface assembly 100 including a housing 102 and a support surface 104 that is retractably coupled to housing 102 between a deployed position 106 (shown in FIG. 1) and a stored position 108 (shown in FIG. 2). As described herein, the retractable nature of support surface 104 selectively provides additional storage or support surface when desired, but also enables support surface 104 to be stored away when not in use. FIG. 2 is a cross-sectional view of support surface assembly 100 illustrating support surface 104 in the stored position 108, and FIG. 3 is a front view of support surface assembly 100. In the example, housing 102 includes a chamber 110 that houses support surface 104 when support surface 104 is in the stored position 108. As best shown in FIGS. 1 and 2, housing 102 includes a neck portion 112 having an opening 114 through which support surface 104 extends.

In the example, support surface 104 includes a plurality of slats 116 that are pivotally coupled together such that support surface 104 is flexible. More specifically, each slat 116 is pivotable with respect to an adjacent slat 116 to enable support surface 104 to be collapsible into the stored position 108. In one example, slats 116 include a living hinge that is integrally formed with slats 116. An integral living hinge requires fewer components and typically weighs less than a separate hinge. In another example, slats 116 include a mechanical hinge coupled to adjacent slats 116 to enable pivoting. A mechanical hinge allows for pivotal motion and is relatively simple to manufacture and assemble. In yet another example, slats 116 are coupled to a flexible backing that enables slats 116 to pivot with respect to an adjacent slat 116. Generally, support surface 104 includes any pivot-enabling device that facilitates operation of slats 116 as described herein.

Housing 102 includes a shaft 118 about which slats 116 of support surface 104 extend when support surface 104 is in the stored position 108. Rolling support surface 104 around shaft 118 allows support surface 104 to be easily withdrawn from housing 102 by pulling in a single direction. Additionally, the majority of the distance traveled by support surface 104 between the stored position 108 and the deployed position 106 occurs within housing 102. As such, support surface 104 does not a wide open space to transition between positions 108 and 106 as do current pivoting lap tables. As shown in FIG. 2, first end slat 116a is fixedly coupled to shaft 118 and a handle 122 is coupled to a second end slat 116b to facilitate moving support surface 104 through opening 114. In the example, handle 122 is used to both pull support surface 104 through opening 114 into the deployed position 106 and also to push support surface 104 back through opening 114 into housing 102 and into the stored position 108.

Furthermore, shaft 118 includes a plurality of retraction facilitation devices 120 that engage with slats 116 of support surface 104 to move support surface 104 between the deployed position 106 to the stored position 108. In one example, retraction facilitation devices 120 are a plurality of high-friction protrusions that grip or engage an exterior surface of slats 116 to facilitate winding support surface 104 about shaft 118. In another example, retraction facilitation devices 120 are a plurality of teeth that engage an opening in slats 116 to facilitate winding support surface 104 about shaft 118. In yet another example, retraction facilitation device 120 is a motor that rotates shaft 118 about an axis. Generally, retraction facilitation device 120 is any mechanism that facilitates transitioning support surface 104 between the deployed position 106 and the stored position 108.

Figure 4:
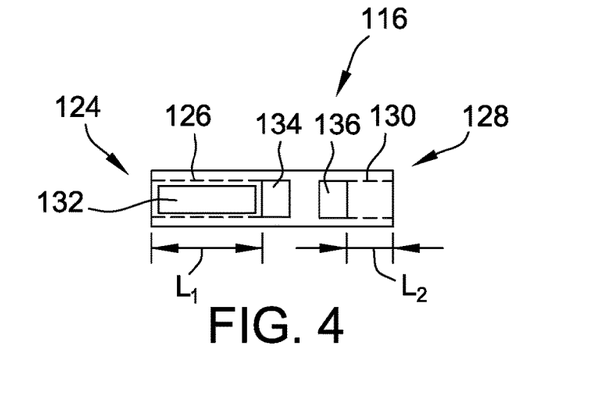
FIG. 4 is a side view of an exemplary slat of the support surface shown in FIGS. 1 and 2.
Figure 5:
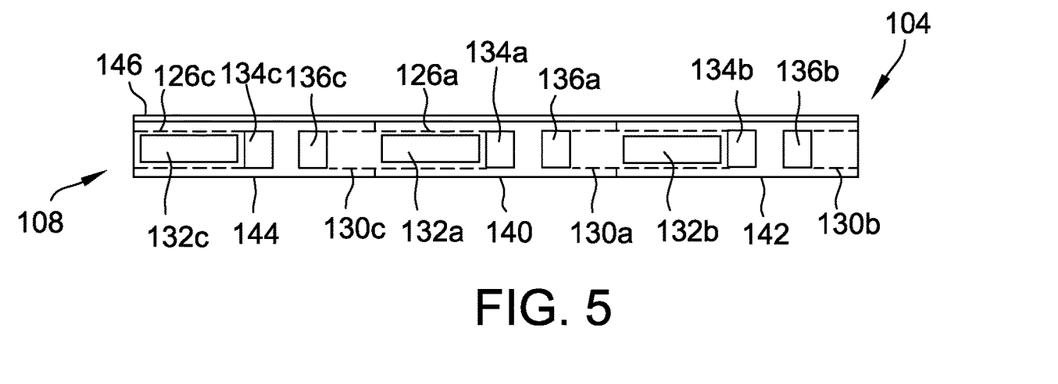
FIG. 5 is side view of the support surface shown in FIGS. 1 and 2 in a retracted configuration.
Figure 6:
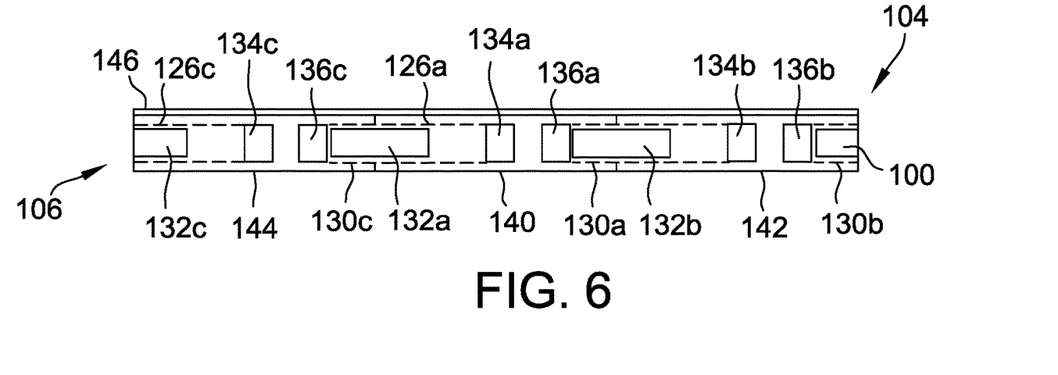
FIG. 6 is side view of the support surface shown in FIGS. 1 and 2 in a deployed configuration.

FIG. 4 is a side view of slat 116 of support surface 104. FIG. 5 is side view of support surface 104 in a modified stored position 108. FIG. 6 is side view of support surface 104 in deployed position 106. In the example, each slat 116 includes a first end 124 having a corresponding first end opening 126 and an opposing second end 128 having a corresponding second end opening 130. First end opening 126 is open-faced at first end 124, as described in detail below. Similarly, second end opening 130 is open-faced at second end 128, as described in detail below. As shown in FIG. 4, first end opening 126 includes a first length L1 and second end opening includes a second length L2 that is short than first length L1. More specifically, first end opening 126 includes a length sufficient to house an entirety of a rod 132 therein to enable adjacent slats 116 to pivot with respect to one another, and second end opening 130 includes a length sufficient to hold only a portion of a rod 132 therein. As described herein, the shorter length L2 of second end opening 130 ensures that only a portion of rod 132 is positioned therein and that the remainder of rod 132 remains within the first end opening 126 of an adjacent slat 116.

In the example, support surface assembly 100 also includes a plurality of rods 132 that are each associated with a corresponding slat 116. That is, every slat 116 also includes a rod 132, with the exception of first end slat 116a. As shown in FIG. 4, rod 132 includes a length that is shorter than first length L1 of first end opening 126, but that is longer than second length L2 of second end opening 130. As such, when support surface 104 is in the stored position 108, rods 132 are housed entirely within first end opening 126 to enable adjacent slats 116 to pivot with respect to one another. Furthermore, as shown in FIG. 6, rod 132 is positioned partially within second end opening 130 of adjacent slat 116 when support surface 104 is in the deployed position 106 such that rod 132 extends across a seam between adjacent slats 116. As described herein, when rods 132 span adjacent slats 116, movement of those adjacent slats relative to one another is prevented or reduced, thus providing a flat surface on which to place items. Furthermore, when rods 132 span adjacent slats 116, support surface 104 is self-supporting and does not require bracing or other structural members that extend from a wall or floor or support the support surface 104.

In the example, each slat 116 also includes at least one magnet positioned between first end opening 126 and second end opening 130 to retain rod 132 in the deployed position 106 or the stored position 108. More specifically, each slat 116 includes a first magnet 134 positioned proximate first end opening 126 and configured to retain a rod 132 in the stored position 108 and a second magnet 136 positioned proximate second end opening 130 to retain an adjacent rod in the deployed position 106.

In operation, a user grasps handle 122 and pulls support surface 104 from housing 102. As slats 116 pass through neck portion 112 of housing 102, a neck magnet 135 positioned within neck portion 112 adjacent opening 114 engages with magnetic rods 132 to slide the rods 132 from the stored position 108 within first end opening 126 to the deployed position 106 where each rod 132 spans the seam between adjacent slats 116 to prevent relative movement of the slats 116. In one example, first and second magnets 134 and 136 within each slat 116 are electromagnets that can be electrically controlled to control movement of rods 132. More specifically, in such an example, first magnets 134 of slats 116 are activated to keep rods 132 in first end openings 126 when support surface 104 is in the stored position. Once support surface 104 has been pulled from housing 102, first magnets 134 are deactivated and second magnets 136 are activated to maintain rods 132 in second end opening 130 in the deployed position 106.

FIG. 5 illustrates support surface 104 in the stored position 108 as slats 116 would look just before exiting opening 114 in housing 102. Support surface 104 includes a first slat 140 having first end opening 126a and second end opening 130a. First magnet 134a is positioned adjacent first end opening 126a and second magnet 136a is positioned adjacent second end opening 130a. A first rod 132a is positioned within first end opening 126a. Similarly, a second slat 142 is positioned adjacent first slat 140 and includes first end opening 126b and second end opening 130b. First magnet 134b of second slat 142 is positioned adjacent first end opening 126b and second magnet 136b of second slat 142 is positioned adjacent second end opening 130b. A second rod 132b is positioned within first end opening 126a. First end opening 126a of first slat 140 is opposite second slat 142 and second end opening 130a of first slat 140 is proximate second slat 142. Similarly, first end opening 126b of the second slat 142 is proximate first slat 140 and second end opening 130b of second slat 142 is opposite first slat 140.

Furthermore, a third slat 144 is positioned adjacent first slat 140 opposite second slat 142 and includes first end opening 126c and second end opening 130c. First magnet 134c of third slat 144 is positioned adjacent first end opening 126c and second magnet 136c of third slat 144 is positioned adjacent second end opening 130c. A third rod 132c is positioned within first end opening 126c.

As shown in FIG. 5, the length of first end opening 126b houses the entire second rod 132b therein to allow first slat 140 and second slat 142 to pivot with respect to one another until they are aligned. More specifically, in the exemplary example, second end opening 130a of first slat 140 is positioned adjacent to and aligned with first end opening 126b of second slat 142 to facilitate sliding second rod 132b partially into second end opening 130a.

In operation, as shown in FIG. 6, slats 140, 142, and 144 pass by neck magnet 135 in neck portion 112 of housing 102 and rods 132a, 132b, and 132c move into the deployed position 106. Specifically, second rod 132b is positioned within first end opening 126b of second slat 142 when the plurality of slats 116 are in the stored position 108, and second rod 132b is positioned within second end opening 130a of the first slat 140 when the plurality of slats 116 are in the deployed position 106. More specifically, because the length of second end opening 130a is less than the length of second rod 132b, second rod 132b spans across a seam between first slat 140 and second slat 142 and is still partially positioned within first end opening 126b of second slat 142 in the deployed position 106. First rod 132a operates in a similar manner with respect to first slat 140 and third slat 144. As such, rods 132a and 132b extend between first slat 140 and third slat 144 and between first slat 140 and second slat 142, respectively, to reduce relative movement of slats 140, 142, 144 and to form a solid, flat surface. In the example, rods 132 maintain the rigidity of support surface 104 such that support surface 104 does not require additional support extending between support surface 104 and the floor or between support surface 104 and the wall of the cabin.

In the example, support surface 104 does include a flexible top layer 146 coupled to the plurality of slats 116. Top layer 148 is formed from a flexible material to facilitate transitioning between the stored position 108 and the deployed position 106. In operation, top layer 146 provides a single consistent surface without seams for the convenience of the user. For example, top layer 146 makes it easier for the user to write on or slide items across support surface 104.

Figure 7:
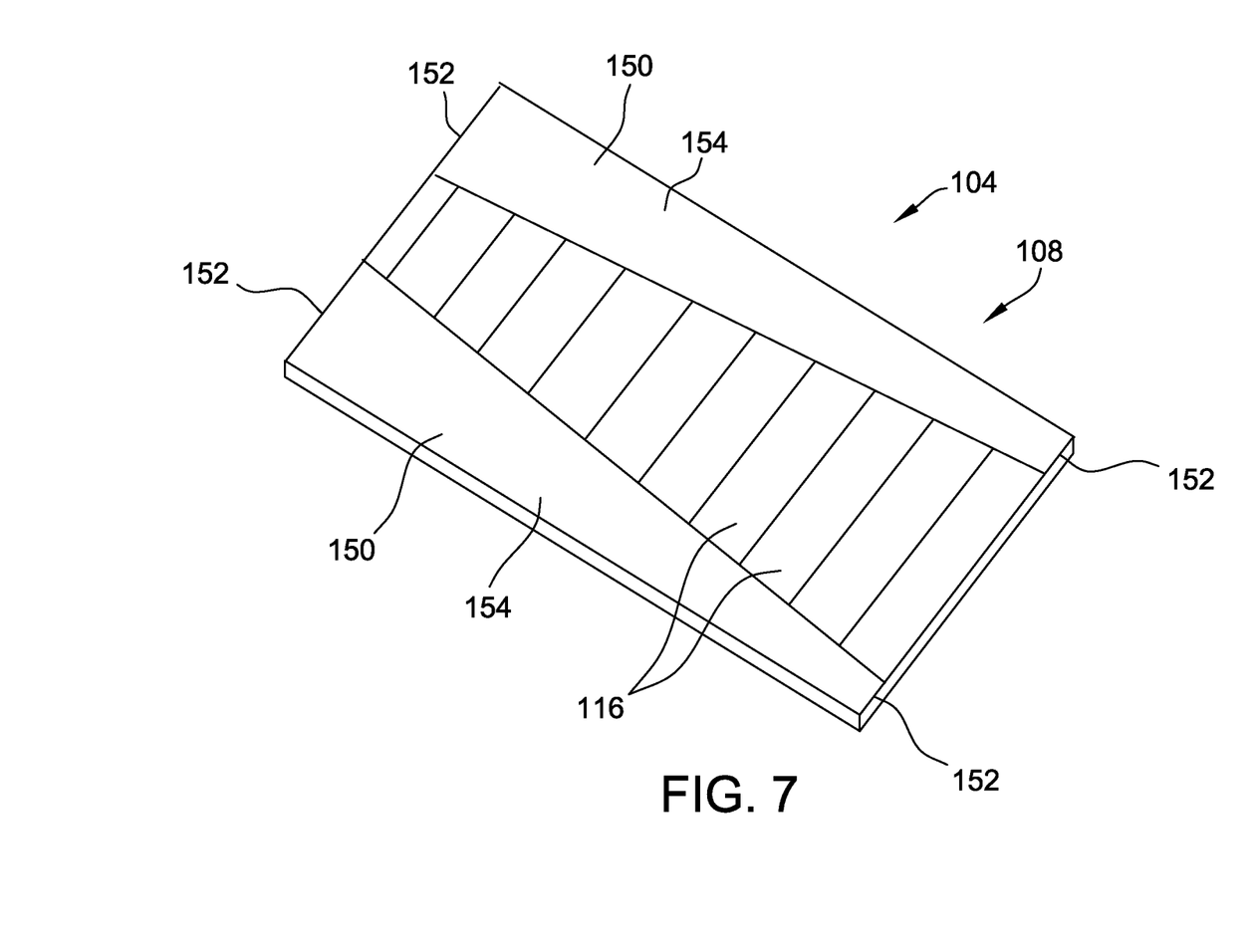
FIG. 7 is a perspective view of the support surface shown in FIGS. 1 and 2 illustrating a pair of sidewalls in the retracted configuration.
Figure 8:
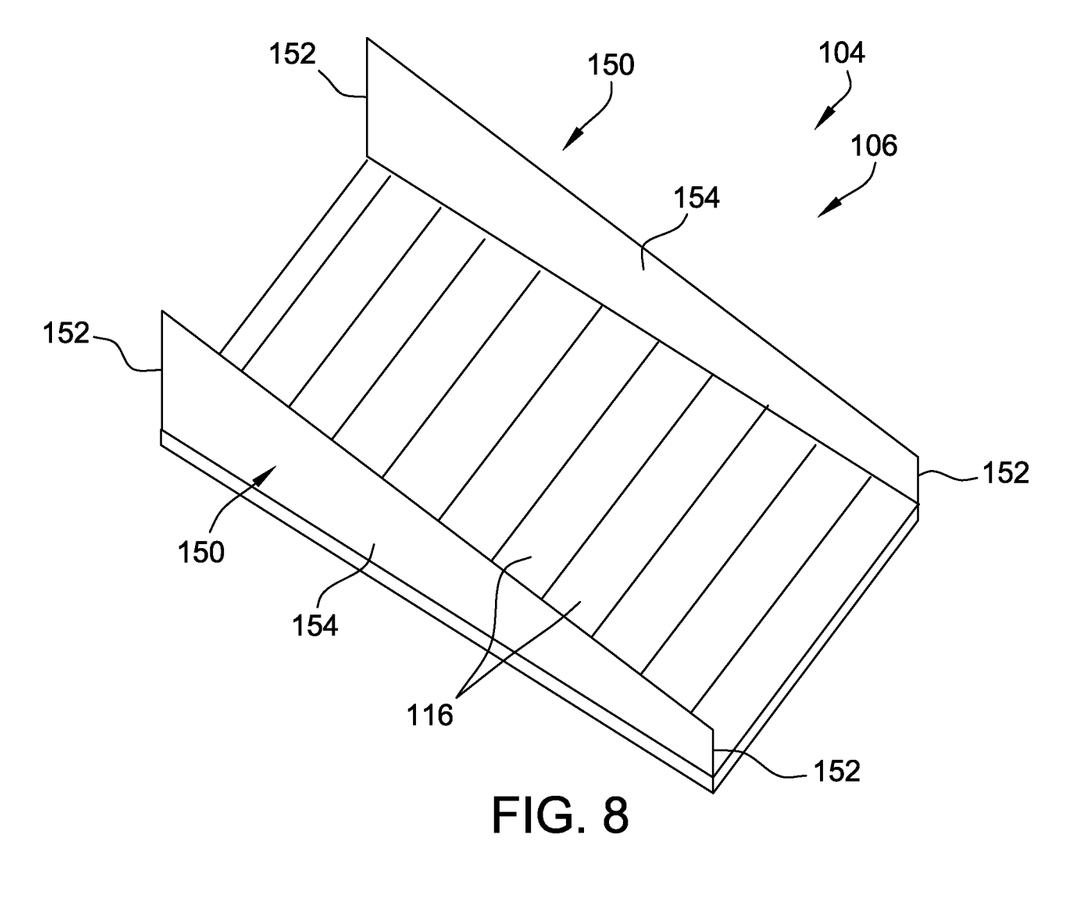
FIG. 8 is a perspective view of the support surface shown in FIGS. 1 and 2 illustrating the pair of sidewalls in the deployed configuration.

FIG. 7 is a perspective view of support surface 104 illustrating a pair of sidewalls 150 in the stored position 108, and FIG. 8 is a perspective view of support surface 104 illustrating sidewalls 150 in the deployed position 106. In the example, sidewalls 150 are pivotally coupled to support surface 104 and are selectively movable between a collapsed configuration when support surface 104 is in the stored position 108 and an extended configuration when support surface 104 is in the deployed position 106. In the extended configuration, sidewalls 150 prevent items from rolling off support surface 104.

Sidewalls 150 include a plurality of frame members 152 coupled to support surface 104 and a wall portion 154 coupled between frame members 152. Wall portion 154 is formed from a flexible material to allow sidewalls 150 to roll with the rest of support surface 104 in the stored position 108. In one example, frame members 152 are latchably coupled to support surface 104 such that the user manually lifts sidewalls 150 into the extended configuration and locks sidewalls 150 in place. In situation where sidewalls 150 are not desired, sidewalls 150 can remain in the collapsed configuration while support surface 104 is in the deployed position 106. In another example, sidewalls 150 are biased towards the extended configuration and automatically assume the extended configuration, via a biasing device such as a spring, when removed from housing 102.

The implementations described herein relate to temporary support surfaces, and, more particularly, retractable temporary support surfaces for use in aircraft. More specifically, in the exemplary implementation, a support surface assembly includes a housing including a chamber and an opening. The support surface assembly also includes a support surface retractably coupled to the housing between a deployed position, when the support surface extends from the housing through the opening, and a stored position, when the support surface is positioned within the housing chamber. The support surface includes a plurality of slats pivotally coupled together, wherein each slat includes a first end opening and an opposing second end opening. The support surface assembly also includes a plurality of rods associated with a corresponding slat of the plurality of slats. Each rod is positioned entirely within the first end opening of a first slat in the stored position. As the support surface is pulled from the housing, a magnet within the housing causes the rods to slide forward to be positioned with the second end opening of the adjacent slat in the deployed position. Because the length of the second end openings is less than the length of the rods, the rods are still partially positioned within the first end opening of the original slat. In such a configuration, the rods holds the slats in place with respect to one another to form the support surface capable of holding items as desired by the user.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A support surface assembly comprising:
a housing comprising a chamber and an opening, wherein the housing comprises a magnet positioned adjacent the opening;
a support surface retractably coupled to the housing between a deployed position and a stored position, wherein the support surface comprises a plurality of slats pivotally coupled together, wherein each slat comprises a first end opening and a second end opening opposite the first end opening; and
a plurality of rods associated with a corresponding slat of the plurality of slats, wherein each rod is positioned entirely within the first end opening of a first slat in the stored position and each rod is positioned partially within the second end opening of an adjacent second slat in the deployed position, wherein the magnet is configured to slide the plurality of rods from the stored position to the deployed position.

2. The support surface assembly of claim 1, wherein each rod is positioned partially within the first end opening of the first slat in the deployed position such that the rod extends across a seam between the first slat and the adjacent second slat.

3. The support surface assembly of claim 1, wherein the housing comprises a shaft, and wherein the support surface extends about the shaft in the stored position.

4. The support surface assembly of claim 3, wherein the shaft comprises a plurality of retraction facilitation devices configured to move the support surface between the deployed position and the stored position.

5. The support surface assembly of claim 1, wherein each slat comprises at least one magnet to retain each rod in the deployed position or the stored position.

6. The support surface assembly of claim 5, wherein each slat comprises a first magnet configured to retain a first rod in the stored position and a second magnet to retain a second rod in the deployed position.

7. The support surface assembly of claim 1, wherein the first end opening includes a first length, and where the second end opening includes a second length shorter than the first length.

8. The support surface assembly of claim 1, wherein the support surface includes a top layer coupled to the plurality of slats, wherein the top layer is formed from a flexible material to facilitate transitioning between the stored position and the deployed position.

9. The support surface assembly of claim 1, further comprising a pair of sidewalls pivotally coupled to the support surface, wherein the pair of sidewalls are selectively moveable between a collapsed configuration when the support surface is in the stored position, and wherein the pair of sidewalls are in an extended configuration when the support surface is in the deployed position.

10. A support surface for use in a support surface assembly, the support surface comprising:
a plurality of slats moveable between a deployed position and a stored position, the plurality of slats comprising a first slat and an adjacent second slat, wherein the first slat and second slat each comprise a first end opening and a second end opening opposite the first end opening, wherein the second end opening of the first slat is positioned adjacent the first end opening of the second slat; and
a plurality of rods comprising a first rod positioned within the first end opening of the second slat when the plurality of slats are in the stored position, and wherein the first rod is positioned within the second end opening of the first slat when the plurality of slats are in the deployed position, wherein the first slat and the second slat each comprise at least one magnet positioned between the first end opening and the second end opening to retain the first rod in the deployed position or the stored position.

11. The support surface of claim 10, wherein the first rod is positioned partially within the first end opening of the second slat and partially within the second end opening of the first slat in the deployed position such that the first rod extends between the first slat and the second slat.

12. The support surface of claim 10, wherein the first end opening of the first slat is opposite the second slat and the second end opening of the first slat is proximate the second slat, and wherein the first end opening of the second slat is proximate the first slat and the second end opening of the second slat is opposite the first slat.

13. The support surface of claim 10, wherein the first rod is positioned entirely within the first end opening of the second slat in the stored position.

14. The support surface assembly of claim 10, wherein the first end opening includes a first length, and where the second end opening includes a second length shorter than the first length.

15. The support surface assembly of claim 10, wherein the second slat comprises:
a first magnet positioned proximate the first end opening and configured to retain the first rod in the stored position; and
a second magnet positioned proximate the second end opening and configured to retain a second rod in the deployed position.

16. The support surface assembly of claim 10, further comprising a pair of sidewalls pivotally coupled to the support surface, wherein the pair of sidewalls are selectively moveable between a collapsed configuration when the support surface is in the stored position, and wherein the pair of sidewalls are in an extended configuration when the support surface is in the deployed position.

17. A method of assembling a support surface assembly, the method comprising:
pivotally coupling a plurality of slats to one another to form a support surface, wherein each slat includes a first end opening and a second end opening opposite the first end opening;
retractably coupling the support surface to a housing such that the support surface is retractable between a deployed position and a stored position, wherein the housing comprises a magnet positioned adjacent a housing opening; and
positioning a rod in the first end opening of at least one slat, wherein the rod is positioned entirely within the first end opening of the at least one slat in the stored position and the rod is positioned partially within the second end opening of an adjacent slat in the deployed position, wherein the magnet slides the rod from the stored position to the deployed position.

18. The method of claim 17, wherein positioning the rod comprises positioning the rod partially within the first end opening of the at least one slat in the deployed position such that the rod extends between the at least one slat and the adjacent slat in the deployed position.

19. A support surface assembly comprising:
a housing comprising a chamber and an opening;
a support surface retractably coupled to the housing between a deployed position and a stored position, wherein the support surface comprises a plurality of slats pivotally coupled together, wherein each slat comprises a first end opening and a second end opening opposite the first end opening; and
a plurality of rods associated with a corresponding slat of the plurality of slats, wherein each rod is positioned entirely within the first end opening of a first slat in the stored position and each rod is positioned partially within the second end opening of an adjacent second slat in the deployed position, wherein each slat comprises at least one magnet to retain each rod in the deployed position or the stored position.

20. A method of assembling a support surface assembly, the method comprising:
pivotally coupling a plurality of slats to one another to form a support surface, wherein each slat includes a first end opening and a second end opening opposite the first end opening;
retractably coupling the support surface to a housing such that the support surface is retractable between a deployed position and a stored positon; and
positioning a rod in the first end opening of at least one slat, wherein the rod is positioned entirely within the first end opening of the at least one slat in the stored position and the rod is positioned partially within the second end opening of an adjacent slat in the deployed position, wherein each slat includes at least one magnet to retain each rod in the deployed position or the stored position.

* * * * *